United States Patent
Hanawa

[11] Patent Number: 5,901,821
[45] Date of Patent: May 11, 1999

[54] ROTARY DAMPER

[75] Inventor: Nobumichi Hanawa, Gifu-ken, Japan

[73] Assignee: Kayaba Kogyo Kabushiki Kaisha, Tokyo, Japan

[21] Appl. No.: 08/813,892

[22] Filed: Mar. 6, 1997

[30] Foreign Application Priority Data

Mar. 26, 1996 [JP] Japan ..................... 8-094698

[51] Int. Cl.$^6$ ....................................... F16F 9/52
[52] U.S. Cl. ........................... 188/277; 188/294
[58] Field of Search ..................... 188/276, 277, 188/290, 293, 294, 296; 236/93 R, 934

[56] References Cited

U.S. PATENT DOCUMENTS

| | | | |
|---|---|---|---|
| 1,852,755 | 4/1932 | Peo ......................... | 188/276 |
| 2,004,904 | 6/1935 | Peo et al. ................. | 188/277 |
| 2,004,960 | 6/1935 | Peo ......................... | 188/277 |
| 2,301,318 | 11/1942 | Peo ......................... | 188/277 |

FOREIGN PATENT DOCUMENTS 64-12152  1/1989  Japan .

*Primary Examiner*—Lee W. Young
*Attorney, Agent, or Firm*—McGlew and Tuttle, P.C.

[57] ABSTRACT

A rotary damper for stabilizing a temperature characteristic while allowing a leakage of operating oil from a clearance between a basic portion of a rotor and a bearing end on the casing side for supporting said rotor with relative rotational motion between the casing and the rotor. Two sets of operating oil chambers (17a, 17b) and (18a, 18b) which alternately expand and contract with rotational displacement of (9) are connected by an interconnecting flowpassage (54) provided on the housing (2). A damping force generating mechanism (44) includes two sets of damping elements (43a, 43b) arranged midway on the interconnecting flowpassage (54). A flow resistance of operating oil passing through the interconnecting flowpassage (54) is imparted by the damping force generating mechanism (44) and the damping force regulating mechanisms (72, 73) to generate a predetermined damping force corresponding to the operating direction of the rotary damper. An independent bypass flowpassage (31) connects the operating oil chambers (17a, 17b) and oil chambers (18a, 18b) and is provided in parallel with the flowpassage (54). A throttle mechanism (21) regulates a throttle degree with the change in temperature and is disposed on the bypass flowpassage (31). A change in leakage amount from a clearance between bearings (11a, 11b) on the casing and the rotor (9) with the change in temperature is offset by a control flow of operating oil leaking through the variable throttle mechanism (21) to minimize oil leakage amount irrespective of temperature 249.

5 Claims, 4 Drawing Sheets

ROTARY DAMPER

BACKGROUND OF THE INVENTION

This invention relates to a rotary damper for utilizing a rotational motion to effect a damping action, and relates to an improvement in the rotary damper suitable for use, for example, with a suspension of an automobile or a suspension for a rear wheel of a motor-cycle or other various apparatuses.

Conventionally, the rotary damper of this kind has been already proposed, for example, in Japanese Patent Application Laid-Open No. 12152/1989 laid open to public on Jan. 17, 1989.

That is, in the rotary damper proposed above, two sets of operating oil chambers are defined between a separate block provided on the inner wall of a casing and a vane provided on the outer periphery of a rotor, and the two sets of operating oil chambers are alternately contracted and expanded with a relative rotational motion between the casing and the rotor.

The above-described two sets of operating chambers are communicated with each other through a series of interconnecting flowpassages comprising a radial oil port bored in the rotor and an oil chamber provided in the center portion, and a damping force generating mechanism is disposed in the oil chamber of the interconnecting flowpassage to impart a flow resistance to operating oil from the operating oil chamber on the contracted side toward the operating oil chamber on the expanded side, thereby generating a predetermined damping force corresponding to the operating direction of the rotary damper by the damping force generating mechanism.

Further, on the rotor side is disposed a temperature compensating mechanism comprising an accumulator aligned in an axial direction of the above oil chamber of the interconnecting flowpassage, an oil storage chamber of the temperature compensating mechanism is communicated with the operating oil chamber through a throttle whereby overs and shorts of operating oil volume resulting from the change of temperature is compensated for by the temperature compensating mechanism and the flow rate of operating oil flowing into the oil storage chamber of the temperature compensating mechanism when the rotary damper is operated is limited by the flow resistance by the throttle.

As described above, in the above-described rotary damper, the flowing of a part of the operating oil moving from the operating oil chamber on the contracting side toward the operating oil chamber on the expanding side into the oil storage chamber of the temperature compensating mechanism is limited as less as possible by the throttle when in operation, to secure the quantity of operating oil supplied to the operating oil chamber on the expanding side to impede generation of vacuum and subsequently prevent disturbance of initial damping characteristic at the time of inversion of the rotary damper.

However, even so, when the operating oil leaks through around the separate block on the casing side and the vane on the rotary side, the damping characteristic as the rotary damper is lowered and disturbed by the leakage of the operating oil.

Of course, a greater part of the leakage of the operating oil can be prevented by applying seal members to the peripheries of the separate block and the vane. However, the seal member applied to the vane cannot seal between the basic portion of the vane and the bearing end of the casing side for supporting the rotor.

For this reason, there occurs a flow of operating oil which immediately leaks from the operating oil chamber on the contracted side to the operating oil chamber on the expanded side through a clearance between the bearing and the basis portion of the rotor without passing through the damping force generating mechanism.

Further, the lower the viscosity resulting from the rise in temperature of the operating oil is, the higher the leakage amount of the operating oil from the aforesaid portion becomes to reduce the amount of operating oil flowing through the interconnecting flowpassage and lower the damping characteristic at the damping force generating mechanism, posing an inconvenience that the temperature characteristic as the rotary damper is deteriorated.

SUMMARY OF THE INVENTION

It is therefore an object of this invention to provide a rotary damper provided with a new constitution capable of stabilizing the temperature characteristic as the rotary damper while allowing a leakage of operating oil from a clearance between the end of a bearing and a basic portion of a rotor.

For achieving the aforementioned object, according to this invention, there is provided a rotary damper in which both operating oil chambers which alternately repeat contraction and expansion with rotational displacement of a casing and a rotor are communicated with each other by an interconnecting flowpassage, and a damping force generating mechanism is disposed on the midway of the interconnecting flowpassage to impart a predetermined damping resistance in respective flowing directions of operating oil, characterized in that an independent bypass flowpassage which immediately short-circuits both the operating oil chambers is provided in parallel with said interconnecting flowpassage, and a variable throttle mechanism for automatically and continuously regulating a throttle degree to a high and low level with the change in temperature is disposed on said bypass flowpassage.

That is, with the provision of the above-described constitution, the amount of the operating oil which immediately leaks from the operating oil chamber on the contracted side to the operating oil chamber on the expanded side not passing though the damping force generating mechanism naturally increases since the operating oil leaks also from the bypass flowpassage in addition to a clearance between the basic portion of the rotor and the end of the bearing for supporting the rotor.

However, with respect to the damping characteristic as the rotary damper, even if the leakage amount of the operating oil increases as described above, the damping resistance caused by the damping force generating mechanism in the interconnecting flowpassage is set in advance in anticipation thereof, whereby the damping characteristic as desired is secured.

Even so, the flow rate of the operating oil which leaks from the operating oil chamber on the contracted side to the operating oil chamber on the expanded side through the clearance between the basic portion of the rotor and the end of the bearing for supporting the rotor still increases or decreases with the change of the magnitude of the viscosity of the operating oil caused by the change of temperature.

However, an opening area of the variable throttle mechanism interposed in the bypass flowpassage is automatically regulated to a large or small size with the magnitude of the viscosity of operating oil caused by the change of temperature, and as a result, the leakage amount of the operating oil from the bypass flowpassage increases or decreases.

Thereby, the change amount of the operating oil which leaks from the clearance between the basis portion of the rotor and the end of the bearing for supporting the rotor due to the change of temperature is offset by the leakage amount from the bypass flowpassage automatically regulated by the variable throttle mechanism.

Thus, the change amount of the leakage amount as a whole is kept small irrespective of the magnitude of the viscosity of the operating oil caused by the change of temperature to stabilize the temperature characteristic as the rotary damper.

DESCRIPTION OF THE PREFERRED EMBODIMENT

The embodiment of this invention will be described hereinafter with reference to the accompanying drawings.

Figure 1:
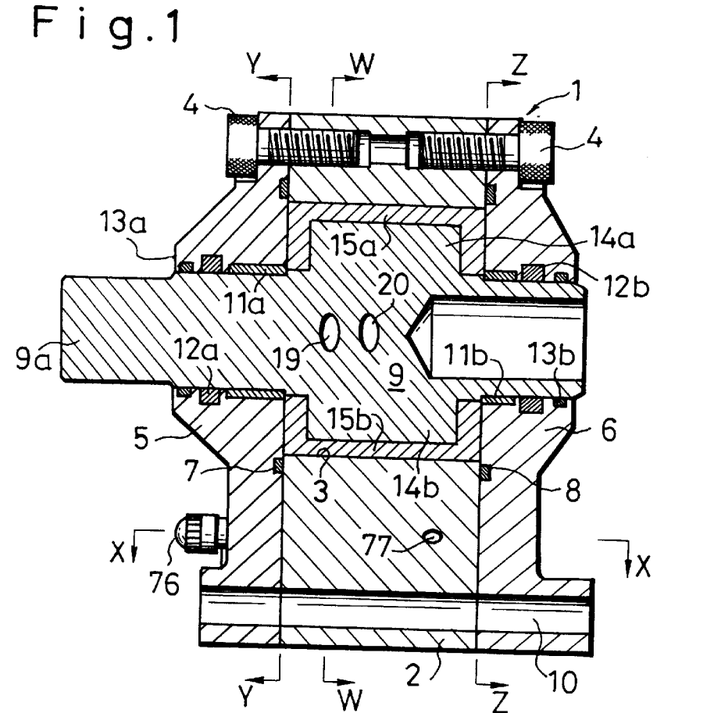
FIG. 1 is a longitudinal sectional front view showing one example of embodiment of a rotary damper to which this invention is applied.
Figure 2:
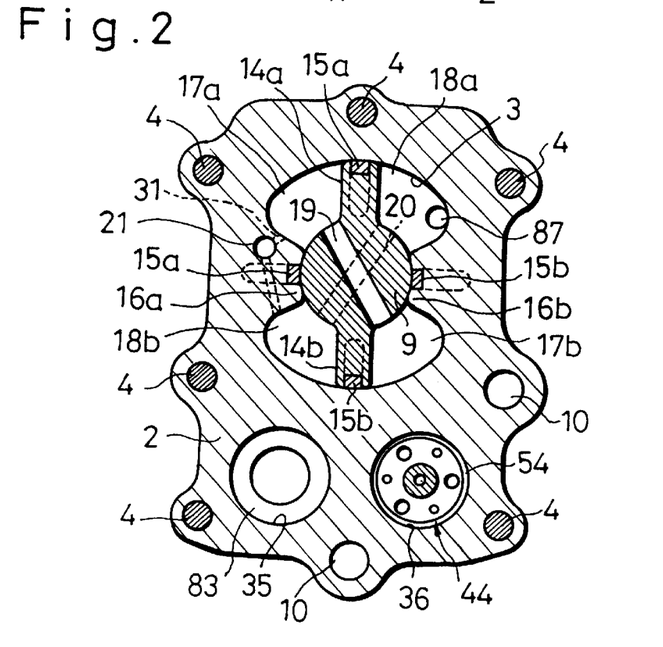
FIG. 2 is a longitudinal sectional side view taken along line W—W in FIG. 1.

In FIGS. 1 and 2, a housing 2 forming a casing 1 of a rotary damper has an axially extending-through bore 3.

Opposite ends of the bore 3 are closed, through seals 7 and 8, by left and right side panels 5 and 6 mounted on opposite sides of the housing 2 by means of bolts 4. The housing 2 and the side panels 5 and 6 constitute the casing 1 of the rotary damper.

A rotor 9 is rotatably inserted into the center portion of the bore 3 extending through the left and right side panels 5 and 6. The left end of the rotor 9 forms a mounting portion 9a which protrudes further outwardly from the outer side of the side panel 5 and is connected through a link or the like to the unspring side of the vehicle body not shown, for example.

The casing 1 has two mounting holes 10 and 10 as a further mounting portion formed extending through the housing 2 and the left and right side panels 5 and 6, and the casing 1 is mounted on the spring side of the vehicle body not shown, for example, through these two mounting holes 10 and 10.

The rotor 9 is rotatably inboarded by means of bearings 11a and 11b provided on the side panels 5 and 6, and sealed by oil seals 12a and 12b and dust seals 13a and 13b.

A portion positioned within the bore 3 of the rotor 9 has two vanes 14a and 14b formed on its outer peripheral surface, deviated in phase by 180 degrees in an axial direction.

The extreme end surfaces and both sides of these vanes 14a and 14b are in contact with the inner wall surface of the bore 3 and the inner wall surfaces of the side panels 5 and 6 on the housing 2 side through vane seals 15a and 15b interposed over the aforementioned extreme end surfaces and both sides of the vanes 14a and 14b, said contact portions being slidably contacted while maintaining an oil-tight condition.

The bore 3 of the housing 2 has likewise two separate blocks 16a and 16b formed on its inner wall opposite to the vanes 14a 14b of the rotor 9, deviated in phase by 180 degrees in an axial direction.

The separate blocks 16a and 16b on the bore 3 side are also provided with the same seals 15a and 15b as the vane seals 15a and 15b of the vanes 14a and 14b previously mentioned from the extreme end surfaces and both sides thereof and are in contact with the outer peripheral surface of the rotor 9 and the inner wall surfaces of the side panels 5 and 6 through the seals 15a and 15b to maintain them in an oil-tight condition.

The interior of the bore 3 in the casing 1 are divided into two sets of operating oil chambers 17a and 17b and operating chambers 18a and 18b which alternately repeat contraction and expansion as the casing 1 and the rotor 9 relatively move by the vanes 14a and 14b and the separate blocks 16a and 16b.

Each set of the operating oil chambers 17a, 17b and 18a, 18b are communicated with one another through oil ports 19 and 20 bored in the rotor 9, and the different set of operating oil chamber 17a and the operating oil chamber 18b are communicated with each other through a variable throttle mechanism 21 for continuously and automatically adjusting a throttle degree to a high or low level as the temperature varies, provided on one separate block 16a in the housing 2.

Figure 3:
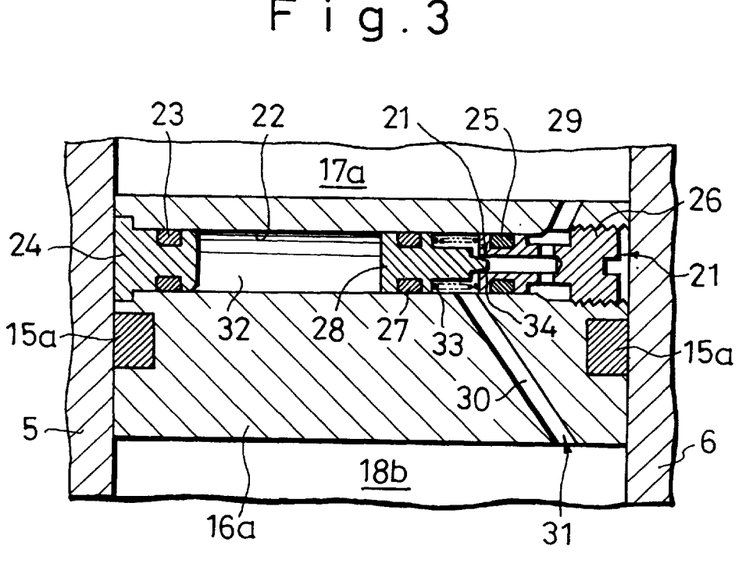
FIG. 3 is a sectional view showing portions of a bypass flowpassage for controlling an amount of internal leakage of operating oil with the change of temperature and a variable throttle mechanism.

In the case of this embodiment, the variable throttle mechanism 21 has a lateral hole 22 bored over and between the side panels 5 and 6 with respect to the separate block 16a, and one end of the lateral hole 22 is sealed by a blind plug 24 having a seal 23.

The other end of the lateral hole 22 is closed by a sheet member 26 as a passage member threadedly mounted to prevent an outer peripheral leakage by a seal 25, and a needle valve 28 likewise to prevent an outer peripheral leakage by a seal 27 is slidably inserted into the lateral hole 22 opposite to the sheet member 26.

The operating oil chamber 17a is communicated with a needle valve 28 through a passage portion of the sheet member 26 by an oil port 29 bored in the separate block 16a, and is communicated with the operating oil chamber 18b from an oil port 30 provided in the separate block 16a through the needle valve 28.

Thus, the sheet member 26, the needle valve 28 and the oil ports 29 and 30 constitute an independent bypass flowpassage 31 which immediately short-circuits the operating oil chamber 17a and the operating oil chamber 18b through the needle valve 28.

Further, the portion of the lateral hole 22 defined by the blind plug 24 and the needle valve 28 constitutes a closed oil chamber 32 filled with oil, and a spring 33 for biasing a throttle degree by the needle valve 28 to a smaller level is interposed between the sheet member 26 and the needle valve 28.

With this, the needle valve 28 is moved toward and away from the sheet member 26 due to the expansion and contraction of oil in the closed oil chamber 32 resulting from the change of temperature to constitute a variable throttle 34.

In this manner, on the midway of the bypass flowpassage 31 is constituted the variable throttle mechanism 21 for automatically adjusting a throttle degree with the change of temperature by the needle valve 28.

While in the present embodiment, the bypass flowpassage 31 having the variable throttle mechanism 21 is provided in the portion of one separate block 16a in the housing 2, it is to be noted that the bypass flowpassage 31 may be provided in the portion of the other separate block 16b or the vanes 14a and 14b on the rotor 9 side or in the portion of the housing 2 or the side plates 5 and 6, and further may be provided in selective combination with respect to these portions.

Turning back to FIG. 2, two bores 35 and 36 laterally extending through the housing 2 are horizontally juxtaposed below the operating oil chambers 17a, 17b, and 18a, 18b.

Figure 4:
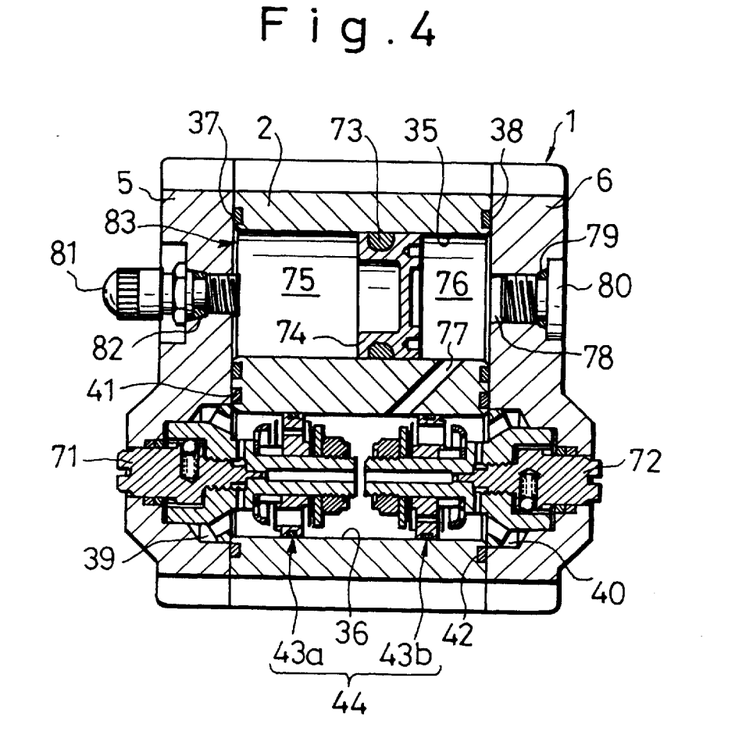
FIG. 4 is a cross sectional plan view taken along line X–X of FIG. 1 showing portions of a damping force generating mechanism and a temperature compensating mechanism.

As will be understood from FIG. 4 which is an enlarged sectional view as viewed from line X—X, openings at opposite ends of the bore 35 are tightly closed by the side panels 5 and 6 in the state in which seals 37 and 38 are sandwiched between it and the housing 2.

On the other hand, openings at opposite ends of the bore 36 are closed oil-tightly by the side panels 5 and 6 in the state of being communicated with recesses 39 and 40 formed on the inner wall surfaces of the side panels 5 and 6 and in which seals 41 and 42 are sandwiched between it and the housing 2.

A set of two damping elements 43a and 43b are disposed opposite to each other from the interior of the recesses 39 and 40 toward the interior of the bore 36. These two damping elements 43a and 43b constitutes a single damping force generating mechanism 44.

Figure 5:
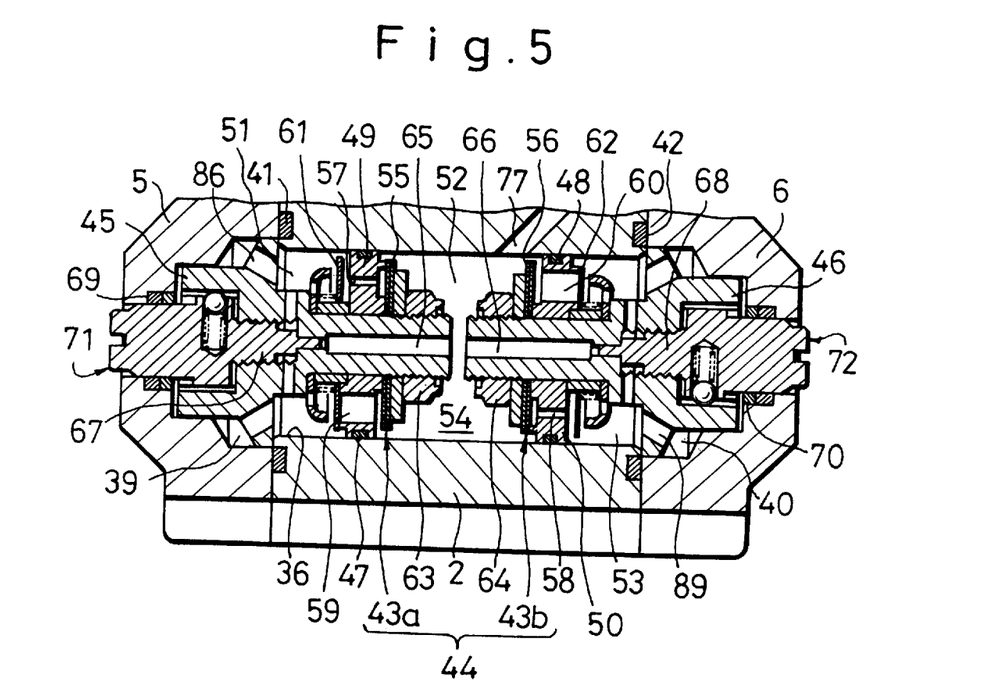
FIG. 5 is a cross sectional plan view showing the portion of the damping force generating mechanism in FIG. 4 in an enlarged scale.

As can be seen from a partially enlarged view of FIG. 5, the damping elements 43a and 43b have independent guide rods 45 and 46, respectively, and proximal ends of the guide rods 45 and 46 are individually sandwiched between the housing 2 and the left and right side panels 5 and 6 and fixed so that they are oppositely disposed in the bore 36.

Partition walls 49 and 50 provided with seals 47 and 48 on their outer peripheral surfaces are fitted in the guide rods 45 and 46, respectively, with them sandwiched between damping valves 55 and 56 and return valves 61 and 62, the partition walls 49 and 50, the damping valves 55 and 56 and the return valves 61 and 62 being secured to the guide rods 45 and 46 by means of nuts 63 and 64.

Thus, the bore 36 is interiorly divided into three oil chambers 51, 52 and 53 by the partition walls 49 and 50 having the damping valves 55 and 56, and the return valves 61 and 62, and these three oil chambers 51, 52 and 53 constitute an interconnecting flowpassage 54.

Moreover, in this case, the damping valves 55 and 56 and the return valves 61 and 62 are disposed with the back surfaces of the damping valves 55 and 56 opposite to each other. The damping valves 55 and 56 close one set of ports 57 and 58 bored in the partition walls 49 and 50 from the side of the oil chamber 52, while the return valves 61 and 62 close the other set of ports 59 and 60 bored in the partition walls 49 and 50 from the sides of the oil chambers 51 and 53.

The guide rods 45 and 46 are bored with oil passages 65 and 66 for communicating the oil chambers 51 and 52 and the oil chambers 52 and 53 of the interconnecting flowpassage 54 with each other in parallel with and detouring the damping valves 55 and 56.

Throttle valves 67 and 68 are threadedly inserted into the oil passages 65 and 66, extending through the proximal ends of the side panels 5 and 6 and the guide rods 45 and 46 from the outside, and seals 69 and 70 are interposed between the side panels 5 and 6 and the throttle valves 67 and 68 to constitute damping force regulating mechanisms 71 and 72 for individually and variably controlling the flow resistance of operating oil passing through the oil passages 65 and 66.

Returning now to FIG. 4, a free piston 74 provided with a seal 73 on the outer peripheral surface thereof is slidably inserted into the other bore 35, and the bore 35 is interiorly divided into a left gas chamber 75 and a right oil storage chamber 76 by the free piston 74.

The oil storage chamber 76 is communicated with a portion of the oil chamber 52 (see FIG. 5) of the interconnecting flowpassage 54 in the bore 36 by an oil path 77 bored in the housing 2 and communicated with the outside through an oiling port 78 provided in the side panel 6. In the normal using state, the oiling port 78 is closed by a plug 80 equipped with a seal.

The left side panel 5 is provided with a gas supply/discharge valve 81 equipped with a seal 82 toward the gas chamber 75 whereby the interior of the bore 35 constitutes a temperature compensating mechanism 83.

In this way, the oil storage chamber 76 in the temperature compensating mechanism 83 is communicated with the oil chamber 52 on the back surface side of the damping valves 55 and 56 in the damping elements 43a and 43b provided on the interconnecting flowpassage 54 and is communicated with the outside from the oiling port 78 by opening the plug 80.

Figure 6:
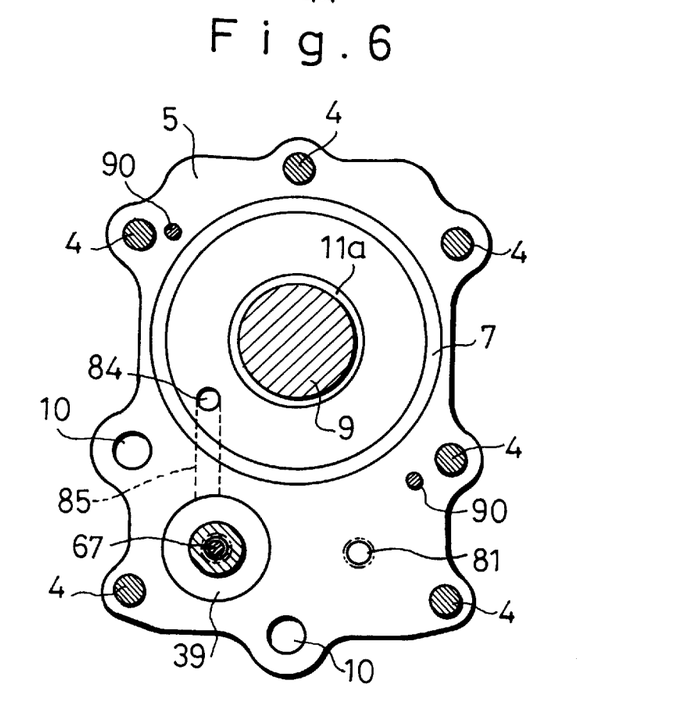
FIG. 6 is a longitudinal sectional side view taken along line Y—Y in FIG. 1 with a left-hand side panel viewed from an inner wall surface side.

On the other hand, as will be understood from FIGS. 2 and 6, one set of operating oil chambers 17a and 17b communicated with each other by the oil path 19 are opened to the stroke end on the contracted side of the operating oil chamber 17b and communicated with the recess 39 through a lateral hole 84 and a longitudinal hole 85 bored in the left side panel 5 and thence communicated with the oil chamber 51 of the interconnecting flowpassage 54 in the bore 36 through a through-hole 86 bored in the proximal end of the guide rod 45 in FIG. 5.

Figure 7:
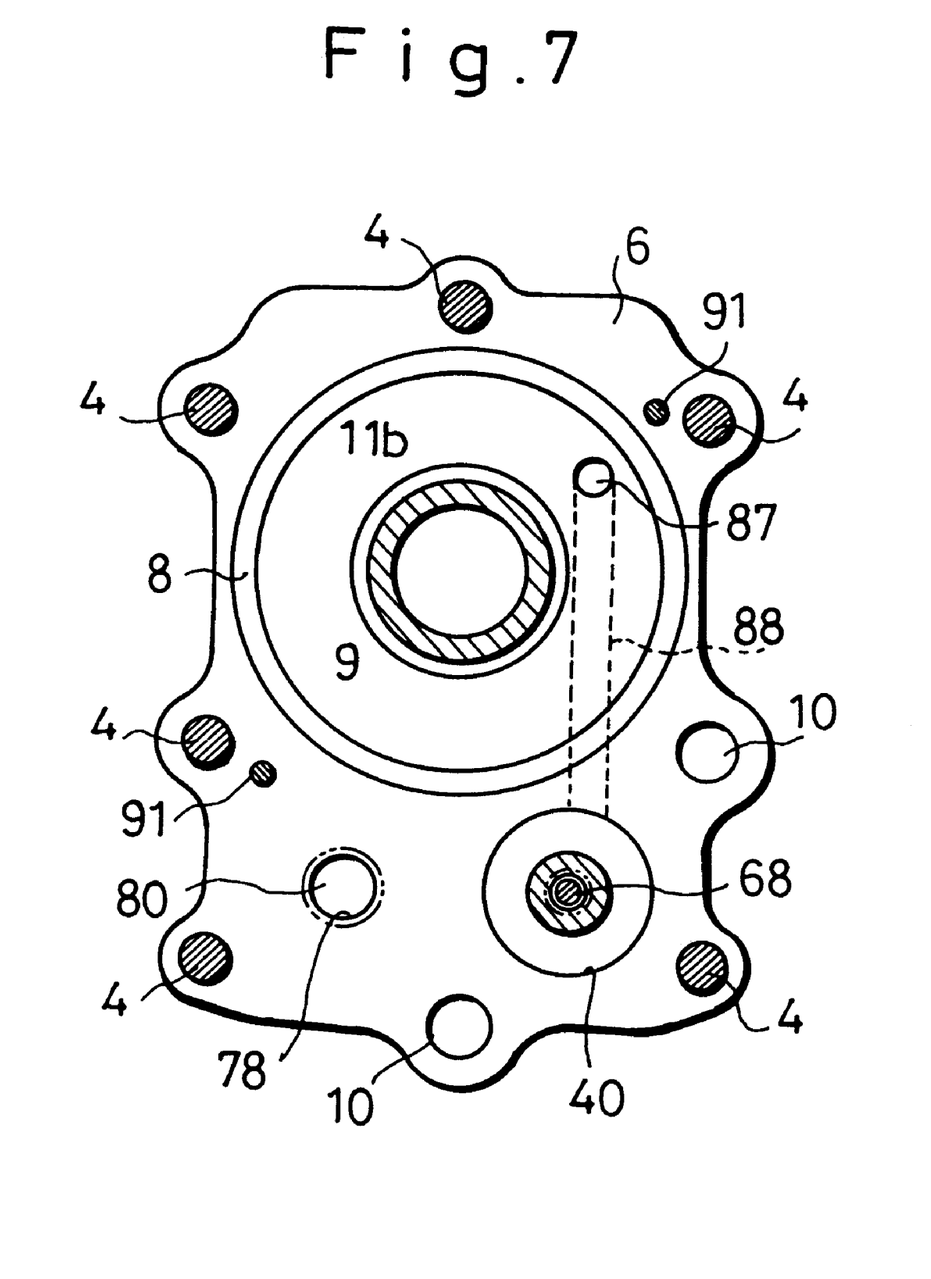
FIG. 7 is a longitudinal sectional side view taken along line Z—Z in FIG. 1 with a right-hand side panel viewed from an inner wall surface side.

Similarly, as will be understood from FIGS. 2 and 7, the other set of operating oil chambers 18a and 18b communicated with each other by the oil path 20 are opened to the stroke end on the contracted side of the operating oil chamber 18a and communicated with the recess 40 through a lateral hole 87 and a longitudinal hole 88 bored in the right side panel 6 and thence communicated with the oil chamber 53 of the interconnecting flowpassage 54 in the bore 36 through a through-hole 89. bored in the proximal end of the guide rod 46 in FIG. 5.

With this, two sets of the operating oil chambers 17a and 17b and the operating oil chambers 18a and 18b alternately contracted and expanded with the relative rotation of the casing 1 and the rotor 9 are communicated with each other through the damping elements 43a and 43b as the damping force generating mechanism 44 provided on the interconnecting flowpassage 54 and the damping force regulating mechanisms 71 and 72 provided on the guide rods 45 and 46.

Pins 90 and 91 shown in FIGS. 6 and 7 indicate locating dowel pins interposed between the housing 2 and the left and right side panels 5 and 6.

While in the present embodiment, the damping force regulating mechanisms 71 and 72 are incorporated into the portions of the damping elements 43a and 43b in the damping force generating mechanism 44, it is to be noted of course that separately from the damping force generating mechanism 44 bored with the oil paths 65 and 66 in the housing 2, the damping force regulating mechanisms 71 and 72 may be provided on the midway thereof.

The operation of the rotary damper according to the embodiment of the present invention constructed as described above will be described hereinafter.

In injecting operating oil into the assembled rotary damper, the plug 80 is removed from the outside to open the oiling port 78. An oiling nozzle is inserted therein from the oiling port 78. Air in the rotary damper is first removed while suppressing and locating the free piston 74 in the temperature compensating mechanism 83 by the extreme end of the oiling nozzle, after which operating oil is injected through the oiling nozzle.

With this, the operating oil injected into the rotary damper is supplied to the oil storage chamber 76 of the temperature compensating mechanism 83 and also supplied from the oil storage chamber 76 to the oil chamber 52 of the interconnecting flowpassage 54 through the oil path 77.

The operating oil supplied to the oil chamber 52 flows into the recess 39 and 40 of the side panels 5 and 6 through the damping force regulating mechanisms 71 and 72 from the oil paths 65 and 66 and thence flows into various parts in the rotary damper through the longitudinal holes 85 and 88 and the lateral holes 84 and 87.

When the oiling nozzle is drawn out, after the operating oil has been filled in the rotary damper, and the oiling port 78 is closed by the plug 80, the oil storage chamber 76 of the temperature compensating mechanism 83 is then communicated with only the oil chamber 52 of the interconnecting flowpassage 54 through the oil path 77.

In this way, in the oiling work, the operating oil supplied from the oiling nozzle flows over the various parts in the rotary damper, rarely receiving the flow resistance, and the oiling work is completed in a short period of time and positively to be simplified.

On the other hand, in use under this condition, it is supposed for example that a vertical relative displacement between the spring and unspring of the vehicle body during the running of the vehicle occurs and the rotary damper receives the external force, the relative rotation between the casing 1 and the rotor 9 occurs so that one set of the operating oil chambers 17a and 17b contract while the other set of the operating oil chambers 18a and 18b expand.

Thereby, the operating oil within the operating oil chambers 17a and 17b on the contracted side is extruded from the through-hole 86 provided on the proximal end of the left guide rod 45 to the oil chamber 51 of the interconnecting flowpassage 54 through the lateral hole 84 and the longitudinal hole 85 provided in the left side panel 5 and the recess 39, and flows into the oil chamber 52 through the throttle valve 67 of the damping force regulating mechanism 71 from the oil path 65 of the guide rod 45. At this time, the operating oil passing through the oil path 65 of the guide rod 45 receives the flow resistance by the throttle valve 67 of the damping force regulating mechanism 71 to generate the damping force corresponding to the flow resistance.

Further, since the operating oil flown into the oil chamber 52 is low pressure oil having passed through the throttle valve 67 of the damping force regulating mechanism 71, it does not flow into the oil storage chamber 76 of the temperature compensating mechanism 83 through the oil path 77 from the oil chamber 52.

Therefore, the operating oil flown into the oil chamber 52 partly passes through the damping force regulating mechanism 72 from the oil path 66 of the guide rod 46 in the right damping element 43b and the most part thereof returns from the port 60 of the partition wall 50 to open the return valve 62 and flows into the oil chamber 53.

Then, the oil passes from the oil chamber 53 to the through-hole 89 provided at the proximal end of the right guide rod 46 and further passes from the longitudinal hole 88 of the side panel to the lateral hole 87 and flows into the operating oil chambers 18a and 18b expanded at that time to compensate for shortage of operating oil generated in the operating chambers 18a and 18b.

When the pressure of operating oil extruded into the oil chamber 51 exceeds the cracking pressure of the damping valve 55 in the damping element 43a, the damping valve 55 is pushed open from the port 57 of the partition wall 49 in the damping element 43a in parallel with the flow of operating oil passing through the oil path 65 of the guide rod 45 to generate a flow of operating oil flowing into the oil chamber 52 while generating a predetermined damping force by the damping valve 55.

Moreover, since the operating oil flown into the oil chamber 52 is also low pressure oil after having passed through the damping valve 55 of the damping element 43 and the throttle valve 67 of the damping force regulating mechanism 71, the operating oil does not flow into the oil storage chamber 76 of the temperature compensating mechanism 83 through the oil path 77 from the oil chamber 52.

Accordingly, these two flows of operating oil are joined within the oil chamber 52 and flow into the oil chamber 53 through the damping force regulating mechanism 72 and the return valve 62 from the oil path 66 of the guide rod 46 in the right damping element 43b and the port 60 of the partition wall 50, and thence pass through the through-hole 89 at the proximal end of the guide rod 46, further passes through the lateral hole 87 from the longitudinal hole 88 of the side panel 6 and flow into the operating oil chamber 18a and 18b expanded at that time to compensate for shortage of operating oil generated in the operating oil chambers 18a and 18b.

As a result, the damping characteristic when the rotary damper is operated is determined by the flow resistance when the operating oil flows through the throttle valve 67 of the damping force regulating mechanism 71 and the damping valve 55 in the damping element 43a.

Further, it is supposed that in contrast with the above, the casing 1 and the rotor 9 relatively move in a direction in which one set of the operating oil chambers 17a and 17b expand while the other set of the operating oil chambers 18a and 18b contract.

In this case, the operating oil in the contracted set of the operating oil chambers 18a and 18b is extruded from the through-hole 89 provided at the proximal end of the guide rod 46 in the right damping element 43b through the lateral hole 87 and the longitudinal hole 88 provided in the right side panel 6 and the recess 40 to the oil chamber 53 of the interconnecting flowpassage 54.

The operating oil extruded to the oil chamber 53 flows into the oil chamber 52 through the throttle valve 68 of the damping force regulating mechanism 72 from the oil path 66 bored in the guide rod 46 of the damping element 43b, and the damping force corresponding to the flow resistance is generated while receiving the flow resistance by the throttle valve 67.

When the pressure of operating oil in the oil chamber 53 exceeds the cracking pressure of the damping valve 56 in the damping element 43b, the damping valve 56 is pushed open from the port 8 of the partition wall 50 in the damping element 43b in parallel with the flow of the operating oil to generate a flow of the operating oil toward the oil chamber 52 and to generate a predetermined damping force by the flow resistance when the damping valve 56 is pushed open.

Since the operating oil flown to the oil chamber 52 is low pressure oil after having passed through the damping valve 56 of the damping element 43b in the damping force generating mechanism 44 and the throttle valve 68 of the damping force regulating mechanism 72, the operating oil will not flow into the oil storage chamber 76 of the temperature compensating mechanism 83 through the oil path 77 from the oil chamber 52.

In any of the above cases, the total quantity of the flow of operating oil flows into the oil chamber 51 with rare resistance through the oil path 65 of the damping element 43a and the return valve 61, and flows into the operating oil chambers 17a and 17b expanded at that time through the longitudinal hole 85 and the lateral hole 64 of the left side panel from the through-hole 86 at the proximal end in the guide rod 45 to compensate for shortage of the operating oil generated in the operating oil chambers 17a and 17b.

Thereby, the damping characteristic when the rotary damper is operated is determined by the flow resistance when the operating oil flows through the throttle valve 68 of the damping force regulating mechanism 72 in the left damping element 43b or the throttle valve 68 and the damping valve 56 of the partition wall 50.

From the foregoing, the rotary damper properly uses the damping characteristics of the damping valves 55 and 56 in the damping force generating mechanism 44 corresponding to the operating direction whereby the damping characteristics corresponding to the operating direction can be individually and suitably set.

In addition to the above matter, the rotary damper operates the damping force regulating mechanisms 71 and 72 from the outside to regulate the flow resistance of the operating oil passing through the throttle valves 67 and 68, whereby the damping characteristics corresponding to the operating direction can be independently regulated.

Even so, a clearance is inevitably formed between the casing 1 and the rotor 9 by which the relative rotation takes place so that a leakage of the operating oil immediately flowing from the operating oil chamber on the contracted side to the operating oil chamber on the expanded side through the clearance occurs.

In this case, the leakage around the vanes 14a and 14b and the separate blocks 16a and 16b can be prevented by applying the seals 15a and 15b thereto. However, the clearance between the ends of the bearings 11a and 11b of the casing, which are the remaining portions, and the proximal end portion of the rotor 9 cannot be sealed by a seal member.

Therefore, there occurs a flow of operating oil which immediately leaks from a clearance between the ends of the bearings 11a and 11b and the proximal end portion of the rotor 9, not passing through the damping force regulating mechanisms 71 and 72 and the damping force generating mechanism 44 at the time of operation.

The lower the viscosity of the operating oil with the rise in temperature is, the higher the leakage amount of the operating oil from the aforementioned portions becomes to reduce the amount of operating oil flowing through the interconnecting flowpassage 54, and the damping characteristics generated in the damping elements 43a and 43b, which is the damping force generating mechanism 44, and the damping force regulating mechanisms 71 and 72 is lowered and the temperature characteristic as the rotary damper is lowered, accordingly.

In this respect, in the embodiment according to this invention so far mentioned, there occurs a flow of operating oil which positively leaks from the operating oil chamber on the contracted side to the operating oil chamber on the expanded side through the variable throttle mechanism 21 from the bypass flowpassage 31 disposed in the rotary damper simultaneously with the leakage of the operating oil.

Moreover, with respect to the leakage amount from the bypass flowpassage 31, the lower the viscosity resulting from the rise in temperature of the operating oil is, the more the oil within the closed oil chamber 32 expands to move the needle valve 28 of the variable throttle mechanism 21 close to the sheet member 26 whereby a throttle degree of the variable throttle mechanism 21 formed by the sheet member 26 and the needle valve 28 is increased to automatically regulate the leakage amount from the bypass flowpassage 31 so as to be decreased.

Thereby, the variable throttle mechanism 21 offsets the change amount due to the temperature change of the operating oil leaked from the clearance between the ends of the bearings 11a and 11b and the proximal end portion of the rotor 9 by the leakage amount from the bypass flowpassage 31 automatically regulated by the variable throttle mechanism 21 to keep small the change amount of the leakage amount as a whole of the operating oil with the change in temperature and to thereby stabilize the temperature characteristic as the rotary damper.

However, by doing so, the quantity of the operating oil which immediately flows from the operating oil chamber on the contracted side toward the operating oil chamber on the expanded side naturally increases by the quantity of leakage from the bypass flowpassage 31. However, in anticipation of this, the damping resistance caused by the damping valves 55 and 56 of the damping elements 43a and 43b in the interconnecting flowpassage 54 and the damping force regulating mechanisms 71 and 72 can be set in advance to thereby maintain the damping characteristic as the rotary damper to a desired state.

While in case of this embodiment, in the variable throttle mechanism 21, oil is sealed into the closed oil chamber 32 as a regulating source, it is to be noted that in place of the sealed oil, a regulating member having a linear expansion coefficient larger than that of the housing 2 is interposed between the blind plug 24 and the needle valve 28 for use to thereby obtain similar operation.

The reason why is that even by doing so, the lower the viscosity resulting from the rise in temperature of the operating oil is, the more the regulating member expands to move the needle valve 28 close to the sheet member 26 and to increase a throttle degree of the variable throttle mechanism 21 to automatically regulate the leakage amount from the bypass flowpassage 31, whereby maintaining small the change amount of the leakage amount as a whole of the operating oil with the change in temperature to stabilize the temperature characteristic as the rotary damper.

The variable throttle mechanism 21 is not necessarily provided on the portion of the separate block 16a of the housing 2 but needless to say it may be disposed selectively or combined and disposed in parallel with respect to the separate block 16b on the opposite side or the casing 1 or the portions of the vanes 14a and 14b of the rotor 9.

As described above, according to this invention, it is possible to offset the change amount of the leakage amount which leaks from the clearance between the bearing on the casing side and the rotor due to the temperature change of the operating oil by the leakage amount from the bypass flowpassage automatically regulated by the variable throttle mechanism to maintain small the change amount of the leakage amount as a whole of the operating oil with the change in temperature and to thereby enhance the temperature characteristic as the rotary damper.

Further, the regulating member having a linear expansion coefficient larger than that of sealed oil or the member having the variable throttle mechanism disposed can be used as the regulating source for the variable throttle mechanism to thereby stabilize the temperature characteristic as the rotary damper with a simple constitution.

Furthermore, the variable throttle mechanism is disposed on the casing or selectively or combined and disposed in parallel on the separate block provided on the casing or the vane on the rotor side, whereby the variable throttle mechanism can be easily incorporated into various large and small rotary dampers to enhance the temperature characteristic.

What is claimed is:

1. A rotary damper comprising:

a casing defining a bore;

a rotor positioned in said bore and dividing said bore into first and second chambers, rotation of said rotor alternately contracting and expanding said first and second chambers;

oil arranged in said chambers;

a first flowpassage defined by said casing and in communication with said first and second chambers;

damping force generating means positioned in said first flowpassage for imparting damping resistance to said oil flowing between said first and second chambers through said first flowpassage, said damping resistance being dependent on a direction of said oil through said first flowpassage, said damping force generating means includes first and second damping valves, and first and second damping regulating means, said first and second damping valves and said first and second damping regulating means dividing said first flow passage into first, second and third spaces, said second space being between said first and second damping valves, said first damping valve and said first damping regulating means imparting a predetermined damping resistance to said oil in a first direction of said oil in said first flow passage, said second damping valve and said second damping regulating means imparting a predetermined damping resistance to said oil in a second direction of said oil in said first flow passage;

a second flowpassage defined by said casing and in communication with said first and second chambers;

a variable throttle mechanism positioned in said second flowpassage and for automatically and continuously regulating a throttling of said oil through said second flowpassage dependent on temperature;

an oil storage chamber defined by said casing and in communication with said second space of said first flowpassage.

2. The rotary damper according to claim 1, wherein the variable throttle mechanism is composed of a regulating member having a linear expansion coefficient larger than that of sealed oil, and a variable throttle for continuously and automatically regulating a throttle degree to a high or low level with expansion and contraction due to a change in temperature of the sealed oil or the regulating member.

3. A damper in accordance with claim 1, wherein:

said oil storage chamber is part of a temperature compensation mechanism.

4. A damper in accordance with claim 1, wherein:

a compensation means is positioned in said oil storage chamber to compensate for volume changes in said oil due to temperature.

5. A damper in accordance with claim 1, wherein:

said variable throttle mechanism compensates for temperature variations in oil leakage between said rotor and said casing.

* * * * *